United States Patent Office 3,312,703
Patented Apr. 4, 1967

3,312,703
2-PYRIDYL AND 2-PIPERIDINYL PHENYL BARBITURIC ACIDS AND METHOD OF PREPARING THIOBARBITURIC ACIDS
Leslie Frederick Wiggins, Wargrave, John William James, Langley, and Maurice Ward Gittos, Slough, England, assignors to Aspro-Nicholas Limited, a British company
No Drawing. Filed May 2, 1963, Ser. No. 277,431
Claims priority, application Great Britain, Dec. 17, 1959, 42,969/59; Dec. 14, 1960, 43,049/60
22 Claims. (Cl. 260—256.4)

This application is a continuation-in-part of our co-pending applications Ser. No. 75,911, filed Dec. 15, 1960, and Ser. No. 276,977, filed Apr. 30, 1963, both now abandoned.

This invention relates to a novel method of preparing certain barbituric acid derivatives, including 2-thiobarbituric acid derivatives, and certain new barbituric acid derivatives made thereby.

We have found a class of barbituric acid derivatives which are of value as chemotherapeutic agents for ameliorating symptoms of paralysis agitans (Parkinson's disease), including in that term both the natural condition of that name and also the drug-induced condition. So far as we have been able to ascertain from the published literature, none of the barbituric acid derivatives which we have found useful in the treatment of paralysis agitans had ever been made prior to our invention, although it is true to say that the prior art does contain a publication wherein reference is made to the structure of two or three of the compounds and to the inability of the authors to make those compounds (Giudicelli et al., Annales Pharm. Francaises, vol. 15, 1957, pp. 533–546).

In the course of our work in synthesising the compounds we have shown to be useful in the treatment of paralysis agitans we have found that there is a whole class of barbituric acid derivatives (including those which Giudicelli and his co-workers tried unsuccessfully to make) which cannot be made by the conventional procedure involving the condensation with urea or thiourea of an appropriately substituted malonic diester in a solution of sodium in an anhydrous lower alkanol, such as methanol or ethanol, under reflux conditions.

The barbituric acid derivatives, including thiobarbituric acid derivatives, which we have found cannot be made by this conventional procedure include some which have now been found to be useful in the treatment of paralysis agitans and others which have now been found to be useful as intermediates for making others which are useful in the treatment of paralysis agitans.

It is an object of our invention to provide a novel method of making certain barbituric acid derivatives. It is another object of our invention to provide a process enabling a synthesis of hitherto unmade barbituric acid derivatives. A yet further object of our invention is to provide novel barbituric acid derivatives which are useful as pharmacologically active compounds or as intermediates for making pharmacologically active compounds.

Our copending application Ser. No. 276,977, filed Apr. 30, 1963, which is also a continuation-in-part of our copending application Ser. No. 75,911, filed Dec. 15, 1960, both now abandoned, describes the compounds we have found to be useful in treating paralysis agitans and claims the treatment of patients having the syndrome of paralysis agitans with these compounds, and further describes and claims pharmaceutical compositions containing these compounds. The subject-matter of that copending application, insofar as relevant hereto is incorporated herein by reference.

The disubstituted malonic esters which we have found cannot be condensed with urea or thiourea in the conventional fashion to provide barbituric acid derivatives have the formula:

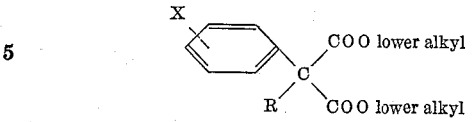

wherein R represents:

(A)

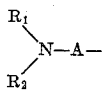

wherein $R_1$ is a lower alkyl group, $R_2$ is a lower alkyl group and A is an unsubstituted or methyl-substituted straight-chain alkylene radical having 2 or 3 chain carbon atoms; or (B)

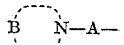

wherein

is a heterocyclic group of from five to seven ring atoms and A is an unsubstituted or methyl-substituted straight-chain alkylene radical having 2 or 3 chain carbon atoms; or (C) $R_3$—$(CH_2)_n$—, wherein $n$ is 1 or 2 and $R_3$ is 2-pyridyl or N-methyl-2-piperidinyl;

and X represents hydrogen or at least one halogen, lower alkyl or lower alkoxy substituent, provided that when R is a dimethylaminoalkyl group which is not substituted by methyl in the alpha position of the alkyl group, X is not hydrogen, but is at least one halogen, lower alkyl or lower alkoxy substituent.

The method which we have invented for converting malonic esters of the above formula to the corresponding barbituric acid derivatives comprises essentially the step of condensing a malonic diester of that formula with thiourea in an inert mutual solvent and in the presence of a condensation agent at a temperature not exceeding 30° C. until the reactants condense to a thiobarbituric acid derivative.

We have found that our method depends on the interaction of the basic side chain nitrogen atom and one of the carbonyl groups in the malonic ester, i.e.,

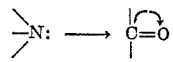

the increased polar character of the carbonyl group facilitating the reaction of the ester with the thiourea, or, usually, the sodium salt of thiourea, allowing the reaction to occur at considerably lower temperatures than in the case of malonic esters in which no interaction is possible. By carrying out the reaction at these lower temperatures, side reactions such as those leading to decarboxylation, are avoided.

The degree of interaction depends on the following four factors:

(1) The length of the carbon chain separating the tertiary amino and carbonyl groups. For interaction this must be 3 or 4 atoms long.

(2) The acidity of the carbonyl group which is greatly influenced by the nature of the non-basic (or phenyl) substituent on the malonic ester. The more acid the carbonyl group, the stronger the interaction.

(3) The basicity of the tertiary nitrogen atom; basicity assisting the interaction, and (4) The steric requirements of the basic group; the nitrogen atom in rings being forced closer to the carbonyl group, thus allowing for a greater degree of interaction.

The above general formula incorporates these requirements. Due to the varying factors influencing the interaction, the method is inapplicable in the case of certain of the possible permutations of X and R. These are when X is hydrogen (the least acid of the phenyl substituents) and R is a dimethylaminoalkyl group not having an alpha-methyl substituent on the alkyl group (the least basic type of non-ring substituents). These malonic esters can be made to react with urea or thiourea by the known method of refluxing the reactants in an ethanol solution of sodium ethoxide.

It will be observed that our novel method, in addition to being characterised by the relatively low temperatures which are used, is limited to the employment of thiourea, that is to say it does not embrace the alternative use of urea. We have found that if an attempt is made to use urea in place of thiourea only an extremely low yield of barbituric acid compound can be obtained. Thus, if Guidicelli and his co-workers had thought to attempt effecting their desired reaction at a lower temperature in order to avoid the competing reaction which was preventing them from obtaining the compounds they desired, they would at best have secured only an extremely low yield of the desired compounds, for they were only concerned to make 2-oxobarbituric acids. It is thus all the more surprising that our lower temperature reaction employing thiourea should give a satisfactory yield of the corresponding thiobabituric acid compounds.

In carrying our novel process into effect the reactants will usually be condensed at a temperature between −10 and +30° C., conveniently at room temperature. The inert mutual solvent for the reactant is conveniently at least one lower alkanol, for example methanol or ethanol.

We particularly prefer to use a mixture of methanol and ethanol containing from 70 to 90% by volume of methanol and from 30 to 10% by volume of ethanol because we have found that a mixture of these two solvents in such proportions, conveniently 4:1, will lead to a yield being obtained which markedly exceeds that which could be obtained by the use of either one solvent or the other.

The condensation agent employed is conveniently an alkali metal, such as sodium, dissolved in the lower alkanol or mixture of lower alkanols.

The condensation reaction usually takes at least 8 hours and may take up to 30 days to proceed to completion. Upon completion of condensation, it is preferred that the solvent is distilled off at a temperature not exceeding 50° C., that is to say normally under reduced pressure, the residue then being extracted with cold water, the aqueous extract neutralised with an acid, and the resulting precipitated thiobarbituric acid recovered, as by filtration. The acid employed is preferably a weak acid and is preferably one the formed salt of which is soluble in water and will thus remain in solution.

In practice, condensation will normally be effected by adding finely powdered dry thiourea to a cool solution of sodium in anhydrous methanol or methanol/ethanol and the resulting mixture stirred until the thiourea has nearly completely dissolved. The basic malonic ester is then added slowly and the mixture stirred at room temperature or below for a suitable time to carry out the reaction, usually from 1 to 30 days. The solvent is then evaporated off at room temperature using a rotary evaporator or equivalent equipment and the residue then dissolved in ice cold water. Any oil which separates at this stage is removed by either extraction. The aqueous solution is then neutralised to a pH value of about 8 (depending upon the iso-electric point of the particular thiobarbituric acid compound) by the dropwise addition of dilute acetic acid. The thiobarbituric acid compound produced precipitates and is filtered off.

In a modification of this general method, the solution of sodium in methanol or methanol/ethanol can be added slowly to a stirred methanol or methanol/ethanol solution of the malonic ester and thiourea at room temperature or below.

When it is desired to form a piperidinylmethyl thiobarbituric acid derivative in accordance with our novel procedure (i.e., a compound in which the piperidine ring is joined to the methyl group otherwise than at the N-atom), it is necessary that the piperidinyl grouping should be formed by catalytic reduction of the corresponding pyridyl compound with Adams' platinum oxide and hydrogen at the malonic ester stage and it is also necessary that the nitrogen atom in the resulting piperidinyl ring should be alkylated, for example methylated, to protect it before the malonic ester is condensed with the thiourea.

The thiobarbituric acid derivatives prepared in the manner described above may be converted to the corresponding non-toxic, pharmaceutically acceptable, acid addition salts, for example the water soluble hydrochloride or hydrobromide, by treatment with the appropriate acid, or metallic salts (such as a sodium salt), where such exist, by treatment with an appropriate base. Some of the acid addition salts crystallise in the form of their hydrates from water with, usually, one molecule of water of crystallisation.

The thiobarbituric acid derivatives prepared in accordance with our invention may, in accordance with a particular feature of our invention, be converted to the corresponding 2-oxobarbituric acid derivatives, for example where it is a 2-oxo-compound which is required and which cannot be obtained by the conventional procedure adopted inter alia by Giudicelli and his co-workers; this is effected by oxidation using an acidic oxidant, such as, for example, dilute aqueous nitric acid of a normality from 1 to 10, for example, 2.5 N or 5 N. By the term "acidic oxidant" we do not mean to embrace agents such as hydrochloric acid or sulphuric acid whose action is hydrolytic, which is not desired.

By way of example, the 2-thiobarbituric acid derivative may be gently heated with 2.5 N nitric acid. The barbituric acid derivative passes into solution and a brisk evolution of nitrous fumes occurs. Addition of excess ammonia to the filtered cooled solution precipitates the desired corresponding 2-oxobarbituric acid derivative.

On a larger scale, it is preferable to add the thiobarbituric acid derivative slowly to boiling 2.5 N nitric acid (8 mols) in the presence of powdered glass.

A pyridylmethyl oxobarbituric acid derivative obtained in this manner from the corresponding 2-thio compound may, if desired, be converted to the corresponding piperidinylmethyl compound by catalytic reduction using Adams' platinum oxide and hydrogen at from 1 to 5 atmospheres pressure and at temperatures from 10 to 60° C. The piperidinylmethyl derivative so obtained may, if desired, be N-alkylated, for example N-methylated, by heating with formic acid and formaldehyde in aqueous solution, desirably in the presence of a soluble formate, for example an alkali metal formate such as sodium formate.

An alkoxy-5-phenyl thiobarbituric acid derivative made in accordance with our invention may, if desired, be converted to the corresponding hydroxy-5-phenyl compound by hydrolysis of the ether group, conveniently by heating with a mixture of hydrobromic acid and glacial acetic acid. The corresponding hydroxy-5-phenyl 2-oxo compound may be obtained from an alkoxy-5-phenyl 2-thio compound by first oxidising the 2-thio group to a 2-oxo group as described above, and then hydrolysing the alkoxy group to hydroxy group.

The basic disubstituted malonic acid diesters to be condensed with thiourea in accordance with our invention may be made by condensing a chloroamine having the general formula RCl, wherein R has the same meaning as defined hereinbefore, with a mono-substituted malonic ester having the general formula:

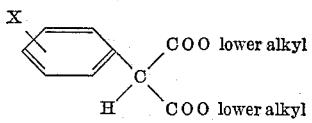

wherein X has the same meaning as hereinbefore, the condensation preferably being carried out using sodium hydride in dioxan. Conveniently, this reaction may be carried out in the following fashion:

One mole of the appropriate mono-substituted malonic ester, for example the diethyl ester, is added in a thin stream to a continuously stirred suspension of one mole of finely powdered sodium hydride in dry dioxan. Vigorous evolution of hydrogen usually occurs at room temperature, but in some cases the sodium hydride suspension has to be warmed to 50° C. to start the reaction. The clear colourless solution of the sodium derivative of the malonic ester obtained in this manner is then warmed to 80–90° C. and one mole of the appropriate chloroamine (i.e., the aminoalkylating agent) is added dropwise over a half hour period. The resulting mixture is then stirred and refluxed for from 3 to 16 hours. The mixture, after being allowed to cool, is diluted with ether, washed with water and extracted with 2 N hydrochloric acid. The oily base liberated on treating the acid extract with excess 5 N sodium hydroxide is isolated by ether extraction. Fractional distillation of the ether extract yields the desired basic malonic ester. Alternatively, in the case of a heat labile base, it may be purified by the addition of ethereal hydrogen chloride, the precipitated hydrochloride being recrystallised.

The terms "lower alkyl" and "lower alkoxy" are used herein to designate respectively alkyl and alkoxy groups containing from 1 to 4 carbon atoms.

The following examples are illustrative of our invention:

EXAMPLE 1

*5-(N-methyl-2′-piperidinylmethyl)-5-phenyl-2-thiobarbituric acid and its hydrochloride*

2-phenyldiethylmalonate (79 g.) was stirred with sodium hydride (8.4 g.) in dry dioxan (200 mls.) until effervescence ceased. The resulting solution of the sodio derivative was then heated to 80° C. and 2-pyridylmethyl chloride (43 g.) added dropwise with constant stirring over a half hour period. After the addition, the mixture was refluxed for 5 hours and then allowed to stand overnight. Water (200 mls.) was added and the resulting oil extracted with ether. Addition of ethereal hydrogen chloride to the dried ether extract precipitated 2(2′-pyridylmethyl)-2-phenyl-diethyl-malonate hydrochloride. Crystallisation from acetone-petroleum ether (40–60°) gave needles of melting point 166–168° C.

2(2′-pyridylmethyl)-2-phenyl-diethyl-malonate hydrochloride (76 g.) prepared in the above manner was dissolved in ethanol (500 mls.) and 1 gram of Adams' platinum oxide was added. The mixture was then hydrogenated at room temperature and atmospheric pressure until hydrogen uptake ceased (3 mols). The solution was filtered and evaporated to give crystals of 2(2′-piperidinylmethyl)-2-phenyl-diethyl-malonate hydrochloride. M.P. 174–175° C.

A mixture of the 2(2′-piperidinylmethyl)-2-phenyl-diethyl-malonate hydrochloride (70.5 g.), water (102 mls.) formic acid (16.8 mls.), sodium formate (21 g.), and formalin (25.2 mls., 37–41% w./v. formaldehyde) was refluxed for 6 hours. The cool solution was made alkaline by the addition of 5 N sodium hydroxide and extracted with ether. Distillation of the dried ether extract gave 2(N-methyl-2′-piperidinylmethyl)-2-phenyl-diethyl-malonate, B.P. 140–147° C./0.15 mm.

Finely powdered dry thiourea (17.25 g.) was added to a cool solution of sodium (5.13 g.) in anhydrous methanol (125 ml.) and the mixture stirred until the thiourea had almost all dissolved. 2(N-methyl-2′-piperidinylmethyl)-2-phenyl-diethyl-malonate (39 g.) was then added dropwise with constant stirring during half an hour and the mixture finally stirred at room temperature overnight. The methanol was evaporated off under reduced pressure and the residue dissolved in ice-water (200 mls.). The oily layer was removed by ether extraction, the aqueous solution neutralised to pH 8 by the addition of dilute acetic acid (5 N), and the precipitated 5-(N-methyl-2′-piperidinylmethyl)-5-phenyl-2-thiobarbituric acid (M.P. 231–2° C. dec.) filtered off.

A solution of the barbituric acid (3.5 g.) in N hydrochloric acid (10 ml.) was evaporated to dryness and the product recrystallised from isopropanol to give 5-(N-methyl-2′-piperidinylmethyl)-5-phenyl-2-thiobarbituric acid hydrochloride, M.P. 216–220° C. dec.

Found: C, 55.40; H, 6.37; N, 11.01; Cl, 10.1%. $C_{17}H_{22}N_3O_2SCl$ requires: C, 55.49; H, 6.03; N, 11.42; Cl, 9.64%. Recrystallisation from water afforded the monohydrate, M.P. 209° C.

EXAMPLE 2

*5-(2′-diethylaminoethyl)-5-phenyl-2-thiobarbituric acid and its hydrochloride*

Finely powdered thiourea (15.2 g.) was stirred with a cool solution of sodium (4.6 g.) in anhydrous ethanol (125 ml.) until it had almost all dissolved. Diethyl 2-(2′-diethylaminoethyl)-2-phenylmalonate (33.5 g.) was then added dropwise with constant stirring during half an hour and the mixture finally stirred at room temperature overnight. The ethanol was evaporated off using a rotary evaporator at a temperature which was not allowed to go above 45° C. and the residue dissolved in ice water (100 ml.). Any oil was removed by extraction with ether and the clear aqueous solution neutralised to pH 8 by the addition of dilute acetic acid (5 N). The precipitated 5-(2′-diethylaminoethyl)-5-phenyl-2-thiobarbituric acid (M.P. 215° C. dec.) was dissolved in N-hydrochloric acid (1 equivalent), the solution evaporated and the residue recrystallised from acetone-ethanol to give prisms of 5-(2′-diethylaminoethyl)-5-phenyl-2-thiobarbituric acid hydrochloride, M.P. 234–6° C. Crystals of the monohydrate (M.P. 238° C.) are obtained on recrystallisation from water.

Found: C, 51.71; H, 6.59; N, 11.21; Cl, 9.47%. $C_{16}H_{22}N_3O_2SCl.H_2O$ requires: C, 51.4; H, 6.47; N, 11.22; Cl, 9.5%.

EXAMPLE 3

*5-(2′-diethylaminoethyl)-5-phenylbarbituric acid and its hydrochloride*

5-(2′-diethylaminoethyl)-5-phenyl-2-thiobarbituric acid (4 g.) obtained in Example 2 was gently heated with 2.5 N nitric acid (50 mls.) until the evolution of nitrous fumes ceased. The mixture was then filtered hot, cooled and excess ammonia added. The precipitate was filtered off and recrystallised from hot water to give crystals of 5-(2′-diethylaminoethyl)-5-phenylbarbituric acid, M.P. 193–194° C.

The barbituric acid was dissolved in an equivalent of N hydrochloric acid, the solution evaporated and the product recrystallised from water to give colourless prisms of 5-(2′-diethylaminoethyl)-5-phenylbarbituric acid hydrochloride, M.P. 275° C. dec.

Found: C, 56.60; H, 6.64; N, 12.40; Cl, 10.34%. $C_{16}H_{22}N_3O_3Cl$ requires: C, 56.56; H, 6.53; N, 12.37; Cl, 10.43%.

EXAMPLE 4

*5-(2′-piperidinylmethyl)-5-phenylbarbituric acid hydrochloride and intermediates*

An aqueous solution of 2(2′-pyridylmethyl)-2-phenyl-diethyl-malonate hydrochloride (prepared as in Example 1) was treated with excess saturated aqueous potassium carbonate and the free base extracted with ether. Evaporation of the ether from the dried extract left a residue of the crude base.

A methanolic solution of the base (49.9 g.) was slowly added to a stirred solution of sodium (7 g.) and thiourea (23 g.) in a 4:1 mixture of dry methanol (240 mls.) and dry ethanol (60 mls.) at room temperature, and the mixture was then stirred at room temperature for one week. The methanol and ethanol were then evaporated off under reduced pressure at room temperature and the residue dissolved in ice-water (150 ml.). The small quantity of oil which separated at this stage was removed by ether extraction and the resulting aqueous solution neutralised to a pH value of 7 by the addition of dilute acetic acid. The precipitate of 5-(2′-pyridylmethyl)-5-phenyl-2-thiobarbituric acid, M.P. 268° C. (after recrystallisation from 2-ethoxyethanol) was isolated by filtration.

The 5-(2′-pyridylmethyl)-5-phenyl-2-thiobarbituric acid (42 g.) was slowly added, with stirring, to a boiling solution of dilute nitric acid (2.5 N; 420 mls.) containing powdered glass (50 g.). After the evolution of nitrous fumes ceased, the mixture was filtered, cooled and excess ammonia added to precipitate crystals of 5-(2′-pyridylmethyl)-5-phenyl-barbituric acid, M.P. 320° C. (after recrystallisation from 2-ethoxyethanol).

Found: C, 64.91; H, 4.43; N, 14.11%. $C_{16}H_{13}N_3O_3$ requires: C, 65.09; H, 4.44; N, 14.23%. (When the experiment was repeated using dilute nitric acid (5 N; 20 mls.) instead of the 2.5 N nitric acid, there was no significant difference in the yield of the 2-oxobarbituric acid.)

A mixture of the 5-(2′-pyridylmethyl)-5-phenyl-barbituric acid (10 g.), glacial acetic acid (120 ml.), concentrated hydrochloric acid (5 mls.) and Adams' platinum oxide (0.5 g.) was hydrogenated at room temperature and 5 atmospheres pressure until hydrogen uptake ceased (3 mols). The filtered solution was evaporated to dryness and the residue crystallised from water containing a few drops of dilute hydrochloric acid. The 5-(2′-piperidinylmethyl)-5-phenylbarbituric acid hydrochloride crystallised as the hydrate, M.P. 197–9° C.

Found: C, 53.96; H, 6.08; N, 11.9; Cl, 9.93%. $C_{16}H_{20}N_3O_3Cl \cdot H_2O$ requires: C, 54.0; H, 6.22; N, 11.8; Cl, 10.0%.

EXAMPLE 5

5-(N-methyl-2′-piperidinylmethyl)-5-phenylbarbituric acid hydrochloride hydrate A mixture of the 5-(2′-piperidinylmethyl)-5-phenyl-barbituric acid hydrochloride (4.8 g.) obtained in Example 4, water (7.5 ml.), formic acid (1.3 ml.), sodium formate (1.6 g.) and formalin (1.9 ml.; 37–41% w./v. formaldehyde) was refluxed for 6 hours. The pH of the cooled solution was adjusted to 9 by the addition of dilute sodium hydroxide and the mixture extracted with chloroform. Treatment of the dried chloroform extract with ethereal hydrogen chloride precipitated 5-(N-methyl-2′-piperidinylmethyl)-5-phenylbarbituric acid hydrochloride hydrate, M.P. 195–200° C. after recrystallisation from chloroform-ether.

Found: C, 51.80; H, 6.43; N, 10.5%.

$C_{17}H_{22}N_3O_2Cl \cdot 2H_2O$ requires: C, 52.64; H, 6.76; N, 10.8%.

EXAMPLE 6

5-(2′-dimethylaminoethyl)-5-m-methoxyphenyl-2-thiobarbituric acid and its hydrochloride Finely powdered dry thiourea (4.2 g.) was stirred with a solution of sodium (1.7 g.) in anhydrous ethanol (60 ml.) at room temperature until it had almost all dissolved. Diethyl 2-(2′-dimethylaminoethyl)-2-m-methoxyphenyl-malonate (12.5 g.) was then added with stirring during half an hour and the mixture allowed to stand over the weekend. The ethanol was evaporated off using a rotary evaporator, the residue dissolved in ice cold water (50 ml.) and the oil removed by ether extraction. Neutralisation of the aqueous solution to pH 8 with dilute acetic acid (5 N) precipitated 5-(2′-dimethylaminoethyl)-5-m-methoxyphenyl-2-thiobarbituric acid, M.P. 235–40° C.

The barbituric acid (5 g.) was dissolved in N hydrochloric acid (15.6 ml.), the solution evaporated and the residue recrystallised from isopropanol-ether to give crystals of 5-(2′-dimethylaminoethyl)-5-m-methoxyphenyl-2-thiobarbituric acid hydrochloride, M.P. 150° C. dec.

EXAMPLE 7

5-(2′-dimethylaminoethyl)-5-m-hydroxyphenyl-2-thiobarbituric acid and its hydrochloride 5 - (2′ - dimethylaminoethyl) - 5 - m-methoxyphenyl-2-thiobarbituric acid (6 g.) obtained from Example 6 was dissolved in a mixture of glacial acetic acid (60 ml.) and concentrated hydrobromic acid (18 ml.), and the solution refluxed for 16 hours. The acids were evaporated off, the residue dissolved in water (20 ml.) and the solution neutralised to a pH value of 8 by the addition of dilute ammonium hydroxide. The precipitated barbituric acid, M.P. 250–2° C. (d.), was dissolved in N hydrochloric acid (11.4 ml.), the solution evaporated, and the residue recrystallised from methanol-ether to give crystals of 5-(2′-dimethylaminoethyl)-5-m-hydroxyphenyl-2-thiobarbituric acid hydrochloride, M.P. 270° C. (d.).

EXAMPLE 8

5 - (2′ - dimethylaminoethyl) - 5 - m - methoxyphenyl-barbituric acid and its hydrochloride 5 - (2′ - dimethylaminoethyl) - 5 - (m - methoxyphenyl)-2-thiobarbituric acid (8 g.) obtained from Example 6 was warmed with dilute nitric acid (2.5 N; 70 ml.) until the evolution of nitrous fumes ceased. The hot solution was filtered to remove the sulphur and then allowed to cool. Crystals of 5-(2′-dimethylaminoethyl)-5-m-methoxyphenylbarbituric acid nitrate separated out, M.P. 232–3° C. dec. A warm aqueous solution of the nitrate (7.5 g.) was treated with ethanolic N-potassium hydroxide (20.4 ml.) On cooling the free barbituric acid crystalised out, M.P. 212–3° C.

The barbituric acid (3.5 g.) was dissolved in N hydrochloric acid (11.5 ml.) the solution evaporated and the product recrystallised from ethanol-ether to give 5-(2′-dimethylaminoethyl)-5-m-methoxyphenylbarbituric acid hydrochloride, M.P. 236° C. dec.

EXAMPLE 9

5 - (2′ - dimethylaminoethyl) - 5 - m - hydroxyphenylbarbituric acid hydrobromide 5 - (2′ - dimethylaminoethyl) - 5 - m - methoxyphenyl-barbituric acid (3.4 g.) obtained from Example 8 was dissolved in a mixture of glacial acetic acid (30 ml.) and concentrated hydrobromic acid (15 ml.) and the mixture refluxed for 16 hours. The acids were evaporated off under reduced pressure and the crystalline residue recrystallised from ethanol-ether to give 5-(2′-dimethylaminoethyl)-5-m-hydroxyphenylbarbituric acid hydrobromide, M.P. 269–71° C.

Found: C, 45.54; H, 4.94; N, 11.10; Br, 21.35%. 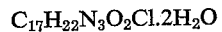
$C_{14}H_{18}N_3O_4 \cdot HBr$ requires: C, 45.19; H, 4.87; N, 11.29; Br, 21.47%.

EXAMPLE 10

5 - (2′ - dimethylaminopropyl) - 5 - phenyl - 2 - thiobarbituric acid and its hydrobromide Diethyl 2-phenylmalonate (118 g.) was stirred with a suspension of sodium hydride (12.5 g.) in dry dioxan (300 ml. at 25–30° C. until effervescence ceased. 1-dimethylaminoisopropylchloride (60.8 g.) was added dropwise to the solution at 90° C. with constant stirring over a half-hour period. After the addition was complete the mixture was stirred and refluxed for a further 16 hours and then allowed to cool. Ether (300 ml.) and water (250 ml.) were then added, and the ethereal layer separated and washed with dilute hydrochloric acid (200 ml.; 2.5 N). Treatment of the acidic aqueous solution with 5 N sodium hydroxide (100 ml.) liberated an oil which was isolated by ether extraction. The oil distilled at 118–130° C./0.07 mm. and consisted of a mixture of two isomeric basic malonates; 2(1′-methyl-2′-dimethylaminoethyl)-2-phenyl diethyl-malonate and 2-(2′-dimethylaminopropyl)-2-phenyl-diethyl-malonate. These were separated by the following method.

A solution of the mixture of basic malonic esters (132.8 g.) in ethanol (100 ml.) was treated with a solution of oxalic acid dihydrate (52.1 g.) in 200 ml. of water and the solvents evaporated under reduced pressure. The syrupy residue was dissolved in hot methyl ethyl ketone and the solution allowed to cool when crystals of 2-(1′-methyl - 2′ - dimethylaminoethyl) - 2 - phenyl - diethyl-malonate hydrogen oxalate separated. The mother liquors were evaporated to give a syrupy residue of crude 2-(2′-dimethylaminopropyl)-2-phenyl-diethyl - malonate hydrogen oxalate. This was converted back to the base by treatment with 5 N potassium hydroxide, the oil being isolated by ether extraction B.P. 116–20° C. (0.1 mm.), $n_D^{13}$ 1.4958.

The crystalline hydrogen oxalate was recrystallised from methyl ethyl ketone to give crystals, M.P. 144.6° C. These were dissolved in warm water, the solution basified with excess 5 N potassium hydroxide and the malonic ester isolated by ether extraction, B.P. 121–7° C./0.1 mm.

Finely powdered dry thiourea (13.5 g.) was stirred with a solution of sodium (5.45 g.) in anhydrous ethanol (170 ml.) at room temperature until it had almost all dissolved. Diethyl 2-(2′-dimethylaminopropyl)-2-phenylmalonate (38 g.) was then added with stirring during half an hour and the mixture allowed to stand overnight at room temperature. The ethanol was evaporated off using a rotary evaporator, the residue dissolved in ice-cold water (120 ml.) and any oil removed by ether extraction. Neutralisation of the aqueous solution to pH 8 with dilute acetic acid (5 N) precipitated 5-(2′-dimethylaminopropyl)-5-phenyl-2-thiobarbituric acid.

The thiobarbituric acid (11 g.) was converted to its hydrobromide by dissolving it in N hydrobromic acid (36.3 ml.), evaporating the solution to dryness, boiling the syrupy residue with acetone, and recrystallising the resulting solid from 2-ethoxyethanol to give 5-(2′-dimethylaminopropyl)-5-phenyl-2-thiobarbituric acid hydrobromide, M.P. 265° C. dec.

Found: N, 10.87%. $C_{15}H_{20}N_3O_2SBr$ requires: N, 10.85%.

EXAMPLE 11

*5 - (2′ - dimethylaminopropyl) - 5 - phenylbarbituric acid and its hydrochloride*

5 - (2′ - dimethylaminopropyl) - 5 - phenyl - 2 - thiobarbituric acid (12 g.) from Example 10 was warmed with 2.5 N nitric acid (100 ml.) until evolution of nitrous fumes ceased. The hot solution was filtered to remove sulphur and allowed to cool. The pH of the solution was adjusted to 8 by the addition of dilute sodium hydroxide (2.5 N), when crystals of 5-(2′-dimethylaminopropyl)-5-phenylbarbituric acid, M.P. 213–5° C. separated out.

The barbituric acid was dissolved in N hydrochloric acid (20 ml.), the solution evaporated and the residue recrystallised from ethanol-ether to give 5-(2′-dimethylaminopropyl) - 5 - phenylbarbituric acid hydrochloride, M.P. 285° C. dec.

Found: C, 55.47; H, 6.18; N, 13.39%. $C_{15}H_{20}N_3O_3Cl$ requires: C, 55.30; H, 6.19; N, 12.90%.

EXAMPLE 12

*5-(2′-morpholinoethyl)-5-phenyl-2-thiobarbituric acid and its hydrochloride*

Sodium (9.2 g.) was dissolved in anhydrous ethanol (300 ml.) and finely powdered dry thiourea (30.4 g.) was added. The resulting solution was cooled to room temperature and diethyl 2-(2′-morpholinoethyl) - 2 - phenylmalonate (69.8 g.) added dropwise over half an hour with constant stirring. The mixture was stirred overnight at room temperature and the solution evaporated to dryness under reduced pressure. The residue was dissolved in ice cold water (200 ml.), any oil removed by ether extraction and the clear aqueous solution neutralised to pH 8 by the addition of dilute acetic acid (5 N). The 5-(2′-morpholinoethyl)-5-phenyl-2-thiobarbituric acid was extracted with chloroform and a portion of the chloroform extract evaporated to give crystals of the thiobarbituric acid, M.P. 218–21° C.

The remainder of the chloroform extract was treated with ethereal hydrogen chloride and the precipitate recrystallised from ethanol to give 5-(2′-morpholinoethyl)-5-phenyl-2-thiobarbituric acid hydrochloride, M.P. 266–70° C. dec.

Found: C, 42.21; H, 5.38; N, 11.32; S, 8.48; Cl, 9.46%. $C_{16}H_{19}O_3N_3S.HCl$ requires: C, 51.95; H, 5.45; N, 11.36; S, 8.67; Cl, 9.58%.

EXAMPLE 13

*5-(2′-morpholinoethyl)-5-phenylbarbituric acid and its hydrochloride*

5-(2′ - morpholinoethyl)-5-phenyl-2-thiobarbituric acid (5 g.) from Example 12 was warmed with dilute nitric acid (2.5 N; 60 ml.) until the evolution of nitrous fumes ceased. The hot solution was filtered to remove sulphur and then allowed to cool. The pH of the solution was adjusted to 9 by the addition of 5 N ammonium hydroxide when crystals of 5-(2′-morpholinoethyl)-5-phenylbarbituric acid, M.P. 260–2° C., separated.

The barbituric acid (6.6 g.) was dissolved in a mixture of 5 N hydrochloric acid (5 ml.), water (20 ml.) and methanol (50 ml.), the solution evaporated and the residue recrystallised from aqueous alcohol to give 5-(2′-morpholinoethyl)-5-phenylbarbituric acid hydrochloride, M.P. 280–90° C. dec.

Found: C, 54.38; H, 5.62; N, 12.3%. $C_{16}H_{19}O_4N_3.HCl$ requires: C, 54.31; H, 5.70; N, 11.9%.

EXAMPLE 14

*5-(2′-piperidinoethyl)-5-phenyl-2-thiobarbituric acid and its hydrochloride*

Finely powdered dry thiourea (44.4 g.) was added to a stirred solution of sodium (13.4 g.) in anhydrous ethanol at room temperature and the mixture stirred until it had nearly all dissolved. Diethyl 2-(2′-piperidinoethyl)-2-phenylmalonate (101 g.) was added with stirring during half an hour and the mixture then stirred at room temperature overnight. The solution was evaporated to dryness under reduced pressure, the residue dissolved in ice-cold water (250 ml.) and any oil removed by ether extraction. The pH of the clear aqueous solution was adjusted to 9 by the addition of 5 N acetic acid and the precipitated 5-(2′ - piperidinoethyl) - 5-phenyl - 2-thiobarbituric acid (M.P. 220° C.) filtered off.

The barbituric acid (20 g.) was dissolved in a mixture of 5 N hydrochloric acid (13.5 ml.) and water (100 ml.), the solution evaporated and the residue recrystallised from ethanol-methylethylketone to give crystals of 5-(2′-piperidinoethyl)-5-phenyl-2-thiobarbituric acid hydrochloride, M.P. 267–9° C. dec.

Found: N, 11.00; S, 8.53; Cl, 9.41%.

$C_{17}H_{21}O_2N_3S.HCl$ requires: N, 11.4; S, 8.71; Cl, 9.63%.

EXAMPLE 15

*5-(2'-piperidinoethyl)-5-phenylbarbituric acid and its hydrochloride*

5-(2'-piperidinoethyl)-5-phenyl-2-thiobarbituric acid (5 g.) was warmed with dilute nitric acid (2.5 N; 66 ml.) until the evolution of nitrous fumes ceased. The hot solution was filtered, cooled and then treated with sufficient 5 N ammonium hydroxide to lower the pH to 9 when crystals of 5-(2'-piperidinoethyl)-5-phenylbarbituric acid (M.P. 230–34° C.) separated.

A solution of the barbituric acid (14 g.) in ethanol (50 ml.) was treated with N hydrochloric acid (50 ml.), the solvents evaporated off and the crystalline residue recrystallised from water to give 5-(2'-piperidinoethyl)-5-phenylbarbituric acid hydrochloride, M.P. 316–7° C. dec.

Found: C, 58.35; H, 6.57; N, 12.25%.

$C_{17}H_{21}N_3O_3 \cdot HCl$ requires: C, 58.03; H, 6.31; N, 11.95%.

EXAMPLE 16

*5-(2'-pyrrolidinoethyl)-5-phenyl-2-thiobarbituric acid and its hydrochloride*

Diethyl 2-(2'-pyrrolidinoethyl)-2-phenylmalonate (67.1 g.) was slowly added during half an hour to a stirred solution of sodium (9.3 g.) and thiourea (30.3 g.) in anhydrous ethanol (300 ml.) at room temperature and the mixture then stirred at room temperature overnight. The ethanol was evaporated off at a temperature below 50° C. under reduced pressure, the residue dissolved in ice-cold water (250 ml.), the solution clarified by an extraction with ether and then neutralised to pH 8 by addition of 5 N ammonium hydroxide. The crystals of 5-(2'-pyrrolidinoethyl)-5-phenyl-2-thiobarbituric acid (M.P. 221–3° C. dec.) were filtered off and dried.

The barbituric acid (20 g.) was treated with 5 N hydrochloric acid (15 ml.) and methyl alcohol (100 ml.), the solvents evaporated off and the residue crystallised from ethanol and then from ethanol-methyl ethylketone to give 5-(2'-pyrrolidinoethyl)5-phenyl-2-thiobarbituric acid hydrochloride, M.P. 259–61° C.

Found: C, 53.86; H, 5.52; N, 11.56%.

$C_{16}H_{19}N_3O_2S \cdot HCl$ requires: C, 54.30; H, 5.69; N, 11.85%.

EXAMPLE 17

*5-(2'-pyrrolidinoethyl)-5-phenylbarbituric acid and its hydrochloride*

5-(2'-pyrrolidinoethyl)-5-phenyl-2-thiobarbituric acid (20 g.) from Example 16 was warmed with dilute nitric acid (2.5 N; 250 ml.) until the evolution of nitrous fumes ceased. The hot solution was filtered, cooled and the pH of the solution adjusted to 9 by the addition of 5 N ammonium hydroxide, when crystals of 5-(2'-pyrrolidinoethyl)-5-phenylbarbituric acid (M.P. 245° C. dec.) separated.

The barbituric acid (13.5 g.) was dissolved in a mixture of 5 N hydrochloric acid (10 ml.) and methyl alcohol (50 ml.), the solution evaporated to dryness and the residue recrystallised from ethanol and then from ethanol-methylethylketone to give 5-(2'-pyrrolidinoethyl)-5-phenylbarbituric acid hydrochloride, M.P. 288–92° C. dec.

Found: C, 57.25; H, 5.97; N, 12.44; Cl, 10.52%. $C_{16}H_{19}N_3O_3 \cdot HCl$ requires: C, 56.90; H, 5.97; N, 12.44; Cl, 10.50%.

EXAMPLE 18

*5-(2'-dimethylaminoethyl)-5-o-chlorophenyl-2-thiobarbituric acid and its hydrochloride*

Finely powdered dry thiourea (1.8 g.) was added to a cool solution of sodium (2.96 g.) in anhydrous ethanol (100 ml.) and the mixture stirred until the thiourea had almost all dissolved. Diethyl 2-(2'-dimethylaminoethyl)-o-chlorophenylmalonate (22 g.) was added dropwise to the stirred solution kept at room temperature over a half hour period. The mixture was finally stirred at room temperature overnight. The ethanol was evaporated off, using a rotary evaporator, the residue dissolved in ice water (100 ml.) and the small quantity of undissolved oil removed by ether extraction. Neutralisation of the aqueous solution to pH8 by the addition of 5 N ammonium hydroxide precipitated crystals of 5-(2'-dimethylaminoethyl)-5-o-chlorophenyl-2-thiobarbituric acid, M.P. 236–8° C.

The barbituric acid (19 g.) was dissolved in a warm mixture of 0.5 N hydrochloric acid (110 ml.) and ethanol (110 ml.). The crystals obtained on cooling were filtered off and the product recrystallised from aqueous alcohol (1:1) to give yellow needles of 5-(2'-dimethylaminoethyl)-5-o-chlorophenyl-2-thiobarbituric acid hydrochloride, M.P. 287–8° C. dec.

Found: C, 46.41; H, 5.02; N, 11.40; Cl, 19.62%. $C_{14}H_{17}N_3O_2SCl_2$ requires: C, 46.41; H, 4.73; N, 11.60; Cl, 19.57%.

EXAMPLE 19

*Comparison of yields from novel method using thiourea and corresponding method using urea*

Finely powdered urea (7 g.) was added to a cool solution of sodium (2.75 g.) in ethanol (80 ml.) and the mixture stirred until the urea had dissolved. Diethyl 2-(2'-diethylaminoethyl)-2-phenylmalonate (20 g.) was then added dropwise with constant stirring during ½ hour and the mixture finally stirred at room temperature overnight. The ethanol was evaporated off at room temperature using a rotary evaporator and the residue taken up in ice water (50 ml.). The oil was extracted with ether and the aqueous solution neutralised by the addition of dilute acetic acid. At pH 9.5 a precipitate of ethyl allophanate, M.P. 190° C. (4 g.) was obtained. Further lowering of the pH to 8 precipitated a crystalline product (1 g.) which was recrystallised from hot water to give 5-(2'-diethylaminoethyl)-5-phenylbarbituric acid, M.P. 194–5° C. Yield 5.5% of theoretical.

The experiment was repeated in the reverse manner, i.e., sodium ethoxide solution was added dropwise to a stirred mixture of the basic malonate and urea in ethanol at room temperature, the addition being carried out overnight (about 16 hours). This resulted in an increased yield of the barbituric acid (2.5 g.; 13.8%).

A further experiment was carried out by repeating the latter experiment in a bath kept at −10° C., the addition taking place over a weekend. No increase in yield was obtained however.

When the method described first above is repeated using thiourea in place of urea a 68% yield of the corresponding thiobarbituric acid is obtained, which may be oxidised to the oxo compound in a yield of 90%, to give an overall yield of 61.2%.

We claim:

1. A method of making a barbituric acid comprising the step of condensing thiourea with a malonic ester in solution in an inert mutual solvent and in the presence of an alkali metal at a temperature up to 30° C. to form a 2-thiobarbituric acid, said malonic ester having the formula:

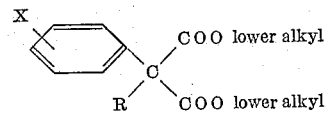

wherein R represents a group selected from the class consisting of:

(A)

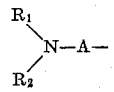

wherein $R_1$ is lower alkyl, $R_2$ is lower alkyl and A is a group selected from the class consisting of unsubstituted and methyl-substituted straight-chain alkylene of 2 to 3 chain carbon atoms;

(B) 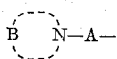

wherein

is a heterocyclic group of five to seven ring atoms and A is a group selected from the class consisting of unsubstituted and methyl-substituted straight-chain alkylene of 2 to 3 chain carbon atoms; and (C) $R_3\text{---}(CH_2)_n\text{---}$, wherein $n$ is a positive whole number up to 2 and $R_3$ is a group selected from the class consisting of 2-pyridyl and N-methyl-2-piperidinyl;

and X is selected from the class consisting of hydrogen, halogen, lower alkyl and lower alkoxy, and when R is a dimethylamino lower alkyl free from α-methyl substitution, X is selected from the class consisting of halogen, lower alkyl and lower alkoxy.

2. A method as claimed in claim 1, wherein the reactants are condensed at a temperature between −10 and +30° C.

3. A method as claimed in claim 2, wherein the reactants are condensed at about room temperature.

4. A method as claimed in claim 1, wherein the inert mutual solvent is at least one lower alkanol.

5. A method as claimed in claim 4, wherein the solvent is a mixture of methanol and ethanol containing from 70 to 90 percent by volume of methanol and from 30 to 10 percent by volume of ethanol.

6. A method as claimed in claim 4, wherein the condensation agent is an alkali metal dissolved in said lower alkanol.

7. A method as claimed in claim 6, wherein after condensation the solvent is distilled off at a temperature up to 50° C., the residue is extracted with cold water, the aqueous extract is neutralised with a weak acid, and the resulting precipitated thiobarbituric acid is recovered.

8. A method as claimed in claim 1, wherein R in said malonic ester is N-methyl-2-piperidinylmethyl.

9. A method as claimed in claim 1, wherein R in said malonic ester is 2-diethylaminoethyl.

10. A method as claimed in claim 1, wherein R in said malonic ester is 2-pyridylmethyl.

11. A method as claimed in claim 1, wherein R in said malonic ester is 2-dimethylaminoethyl and X is methoxy.

12. A method as claimed in claim 1, wherein R in said malonic ester is 2-dimethylamino-2-methylethyl.

13. A method as claimed in claim 1, wherein R in said malonic ester is 2-N-morpholinoethyl.

14. A method as claimed in claim 1, wherein R in said malonic ester is 2-N-piperidinoethyl.

15. A method as claimed in claim 1, wherein R in said malonic ester is 2-N-pyrrolidinoethyl.

16. A method as claimed in claim 1, wherein the formed thiobarbituric acid is oxidised to the corresponding oxobarbituric acid by reaction with aqueous nitric acid.

17. A method as claimed in claim 10, wherein the 5 - (2' - pyridylmethyl) - 5 - phenyl - 2-thiobarbituric acid formed by condensation is oxidised by reaction with aqueous nitric acid to a 5-(2'-pyridylmethyl)-5-phenyl-2-oxobarbituric acid.

18. A method as claimed in claim 17, wherein the 5-(2'-pyridylmethyl)-5-phenyl-2-oxobarbituric acid is reduced by catalytic hydrogenation to a 5-(2'-piperidinylmethyl)-5-phenyl-2-oxobarbituric acid.

19. A method as claimed in claim 19, wherein the 5-(2'-piperidinylmethyl)-5-phenyl-2-oxobarbituric acid is methylated by reaction with formic acid and formaldehyde to a 5 - (N-methyl-2'-piperidinylmethyl)-5-phenyl-2-oxobarbituric acid.

20. A method as claimed in claim 8, wherein the 5 - (N-methyl-2'-piperidinylmethyl)-5-phenyl-2-thiobarbituric acid formed by condensation is oxidised by reaction with aqueous nitric acid to a 5-(N-methyl-2'-piperidinyl)-5-phenyl-2-oxobarbituric acid.

21. A thiobarbituric acid selected from the class consisting of those having the formula:

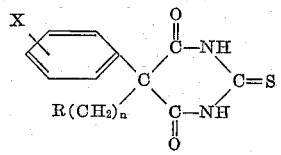

and metallic and acid addition salts of those having that formula, in which formula R is 2-pyridyl, $n$ is a positive whole number up to 2, and X is selected from the class consisting of hydrogen, halogen, lower alkyl and lower alkoxy.

22. A 5-(2'-pyridylmethyl)-5-phenylbarbituric acid.

References Cited by the Examiner

UNITED STATES PATENTS

| 809,362 | 1/1906 | Engelmann | 260—257 |
| 2,182,518 | 1/1939 | Dox | 260—260 |
| 2,876,225 | 3/1959 | Donnison | 260—257 |
| 2,899,435 | 8/1959 | Brandstrom | 260—257 |

FOREIGN PATENTS 825,832   12/1959   Great Britain.

OTHER REFERENCES

Cope et al.: Jour. Amer. Chem. Soc., vol. 54, 1932, pp. 4319–4325.

Fieser et al.: Advanced Organic Chemistry, Reinhold Publishing Corp., New York 1961, pp. 176 and 496.

Giudicelli et al.: Annales Pharm. Francaises, vol. 15, 1957, pp. 533–546.

Sidgwick: The Organic Chemistry of Nitrogen, Oxford University Press, London, 1937, page 537.

ALEX MAZEL, *Primary Examiner.*

HENRY R. JILES, *Examiner.*

MARY O'BRIEN, *Assistant Examiner.*

UNITED STATES PATENT OFFICE
CERTIFICATE OF CORRECTION

Patent No. 3,312,703                            April 4, 1967

Leslie Frederick Wiggins et al.

It is hereby certified that error appears in the above numbered patent requiring correction and that the said Letters Patent should read as corrected below.

Column 3, line 70, for "either" read -- ether --; column 8, line 65, for "45.54" read -- 45.43 --; column 10, line 25, for "42.21" read -- 52.21 --; column 14, line 10, for "19" read -- 18 --.

Signed and sealed this 26th day of December 1967.

(SEAL)
Attest:

Edward M. Fletcher, Jr.                          EDWARD J. BRENNER
Attesting Officer                                Commissioner of Patents